United States Patent [19]

Salmon et al.

[11] 4,259,676
[45] Mar. 31, 1981

[54] THERMAL PRINT HEAD

[75] Inventors: Peter C. Salmon; David M. Salmon, both of Los Altos, Calif.

[73] Assignee: Santek, Inc., Los Altos, Calif.

[21] Appl. No.: 61,902

[22] Filed: Jul. 30, 1979

[51] Int. Cl.³ .......................................... G01D 15/10
[52] U.S. Cl. ............................... 346/76 PH; 29/611; 219/216; 338/308
[58] Field of Search .................... 346/76 PH; 219/216; 29/543, 611, 620; 338/307-309

[56] References Cited

U.S. PATENT DOCUMENTS

| | | | |
|---|---|---|---|
| 3,609,294 | 9/1971 | Cady, Jr. et al. | 219/216 |
| 3,700,852 | 10/1972 | Ruggiero | 219/216 |
| 3,825,722 | 7/1974 | Taniguchi | 219/216 |
| 3,967,092 | 6/1976 | Conta et al. | 346/76 PH X |
| 3,973,106 | 8/1976 | Ura | 219/216 |
| 3,988,569 | 10/1976 | Henrion | 346/76 PH X |
| 4,007,352 | 2/1977 | Ura | 219/216 |
| 4,099,046 | 7/1978 | Boynton et al. | 219/543 X |
| 4,194,108 | 3/1980 | Nakajima et al. | 346/76 PH X |

Primary Examiner—Richard A. Wintercorn
Attorney, Agent, or Firm—Thomas E. Schatzel

[57] ABSTRACT

A thermal print head including a conductive base plate, a substrate slab mounted on the base and having various deposits on the upper and lower surfaces thereof, such deposits including conductive traces, conductive leads, a thermally insulating material, resistors, and conductive deposits for delivering electrical potential across the resistors, one or more integrated circuits mounted on the slab for controlling said print head based on electrical signals from external data processing equipment and connectors for delivering signals and potentials to the print head.

15 Claims, 7 Drawing Figures

THERMAL PRINT HEAD

BACKGROUND OF THE INVENTION

1. Field of the Invention

This invention relates generally to devices for making a permanent record of electronic information and more specifically to thermal print heads.

2. Description of the Prior Art

With the advent of high speed data processing and delivery systems, it has become necessary to develop high speed, high accuracy and economical means for rendering the data or information into permanent, readable form. The data processing industry has attempted to accomplish these goals utilizing conventional typewriter technology; line printers derived from lithograph techonolgy; and new technologies including rotary impact print heads such as the devices known as "daisy wheels;" impact matrix printers; and the subject of this invention, thermal printers. The applications of each of these technologies differ regarding the speed of operation, the total volume of materials printed, the type of printing medium utilized, the number of moving parts and the total cost of manufacture.

Thermal printers, such as the present invention, are designed to minimize moving parts and cost of construction. Thermal printers are not particularly applicable to situations with a high volume of data printed because they require specially treated paper which is more expensive than ordinary paper. Thermal printers are particularly utilized in calculators, printing scientific instruments, computer terminal and other applications with low volume paper requirements.

A thermal printer operates by causing the application of a point source of heat to specially treated paper. The point of heat causes the special paper to darken at the point of application in a dot form. The typical manner in which characters are formed using thermal printers is by the use of a matrix, that is an N×M array of dots. A microprocessor or other data processing unit typically determines the specific members of the array which will be darkened so as to create the letter, numeral or figure desired.

A thermal printer consists of a microprocessor or other unit which translates incoming data into a printable form, a system to deliver signals from the microprocessor to the printing head, high-current drivers which can deliver the required amount of energy to burn the dots, a print head upon which the point heat sources are created and a system for bringing the paper in contact with the print head. Various prior art thermal printers utilize a movable print head capable of moving laterally across the paper much in the same manner as a typewriter carriage. Other applications of thermal printers utilize a fixed print head and move only the paper relative to the print head. In the applications where a fixed print head is used, the print head must extend the entire usable width of the paper to print a full line.

One common element of the prior art print heads known to the inventors herein, is that the electronic driver circuits for the burn points, commonly transistors, are located externally to the print head itself. Consequently, all of the logic and switching mechanisms are located external to the print head. A disadvantage of using structures wherein the logic circuitry is exterior to the print head is that the number of input points on the print head is increased such that it equals or is a substantial subset of the number of burn points.

An example of a prior art print head is described in a publication of Displaytek Corporation describing part number DC-1157, 5×7 dot matrix, thermal print head component. This print head utilizes individual input leads for each of the 35 burn points in its 5×7 matrix. Furthermore, the input section of the print head is considerably wider than the printing section where the burn points are located. This makes it difficult to array print heads of this variety next to one another so as to form a line. The Displaytek DC-1157 and other prior art printing heads such as those manufactured by Gulton Industries, and described in Application Bulletin No. 201, utilize matrices which print the entire matrix at one time rather than printing the individual rows non-simultaneously. Printers which print an entire character matrix at one time, and have a discrete spacing between such matrices are incapable of appropriately representing graphic figures or other characters for which they are not specifically programmed. If fixed matrix printers are programmed to represent a graphic image such as the arc of a curve, the speed of printing is slow.

SUMMARY OF THE PRESENT INVENTION

It is therefore an object of the present invention to provide a more efficient and simple electrical interface between the external processor of the printer and the print head.

It is also an object of the present invention to provide for a high performance print head in terms of net energy per dot of printing.

It is another object of the present invention to provide for a high performance print head in terms of total energy required to operate the system.

it is another object of the present invention to provide a thermal print head having improved durability and reliability for the heating elements.

It is a further object of the present invention to provide a thermal print head which is economical to manufacture relative to those of the prior art.

It is yet another object of the present invention to provide a thermal print head having improved electro-mechanical reliability over the prior art.

Briefly, the presently preferred embodiment of a thermal print head of the present invention includes: a conductive base plate; a substrate slab having deposited upon it various layers including conductive traces, thin and thick film conductors, a thin film resistor layer, and a protective-passivating coating layer; a thin glass band upon said substrate slab such that the burn points of the resistors are contained on top of such band; a pair of large scale integrated circuits (LSIC'S) mounted upon the substrate slab and electrically connected to the traces thereon; and a plurality of connecting solder pads by which the intergrated circuits are connected to incoming data signals, control signals and voltage delivered by the processor and power supplies of the printer.

An advantage of the present invention is that the placement of the large scale integrated circuits directly on the print head itself facilitates high resolution printing without requiring a large number of connecting points to the print head.

Another advantage of the present invention is that the placement of the large scale integrated circuits directly on the print head itself, rather than the use of separate drivers for each of the barn elements, reduces the size and cost of construction of the print head.

A further advantage of the present invention is that thermally isolating the burn points on a glass strip improves the heat transfer characteristics in the burn point area and produces cleaner, sharper burns.

Still another advantage of the present invention is that the durability and reliability of the printing system is increased by the proximity of the heating elements to the corresponding drivers which reduces reliability problems which would be created by extra cables and by extra connection points.

These and other objects and advantages of the present invention will no doubt become apparent after a reading of the following detailed description of the preferred embodiment which is illustrated in the several figures of the drawing.

DETAILED DESCRIPTION OF THE PREFERRED EMBODIMENT

Figure 1:
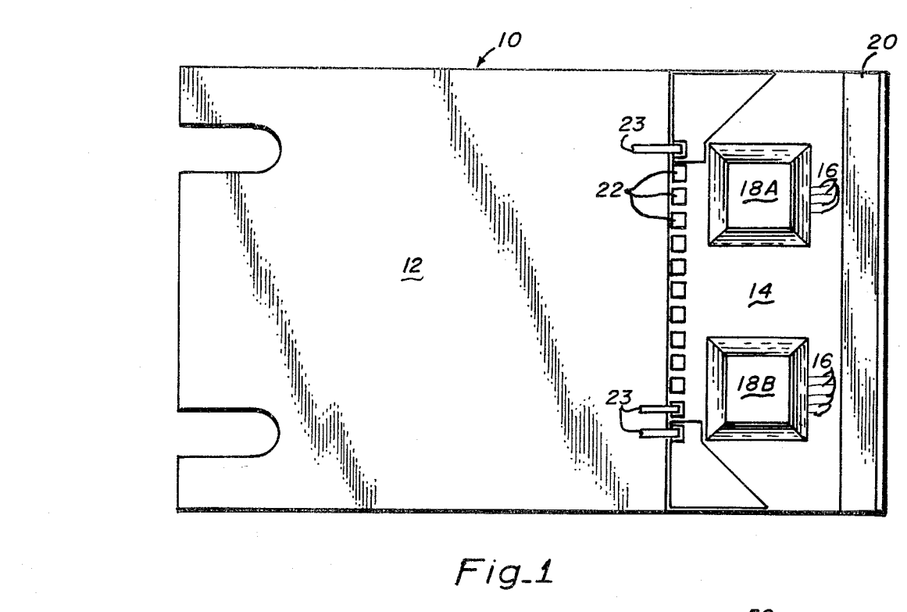
FIG. 1 is a top plan view of a preferred embodiment of a thermal print head of the present invention.
Figure 2:
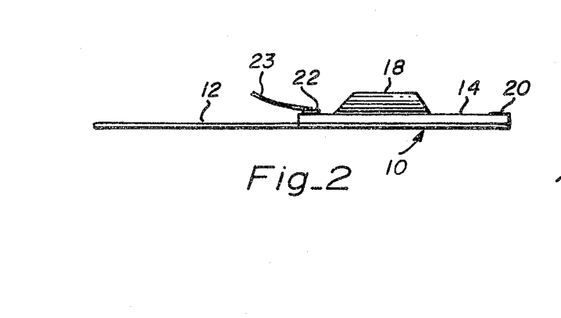
FIG. 2 is a left side elevation view of the print head of FIG. 1.

Referring now to FIGS. 1 and 2, a top plan view and a side elevational view of a preferred embodiment of a print head of the present invention and referred to by the general reference character 10 is illustrated. The thermal print head 10, is a device adapted to receive incoming electrical data signals and to translate such signals into point heat sources. These heat sources, upon contacting thermally sensitive paper, result in dots being formed on the paper. The pattern of dots depends on the nature of the data signals. Thus, the data appears as a series of discrete dots which, in total, constitute readable alphanumeric symbols and/or graphic representations upon the thermal paper.

The print head 10 includes a rectangular base 12. Base 12 is a flat plate of discrete thickness and constructed of a strong but flexible material which readily conducts both heat and electricity. Bonded to one end of base 12 is a rectangular substrate slab 14. The slab 14 is positioned over the base 12 such that the exterior edges are congruent in the vertical dimension with those of one end of base 12. Substrate slab 14 is constructed of material such that it acts as an insulator to electrical current and a heat sink for the thermal energy created by the operation of the print head.

Figure 3A:
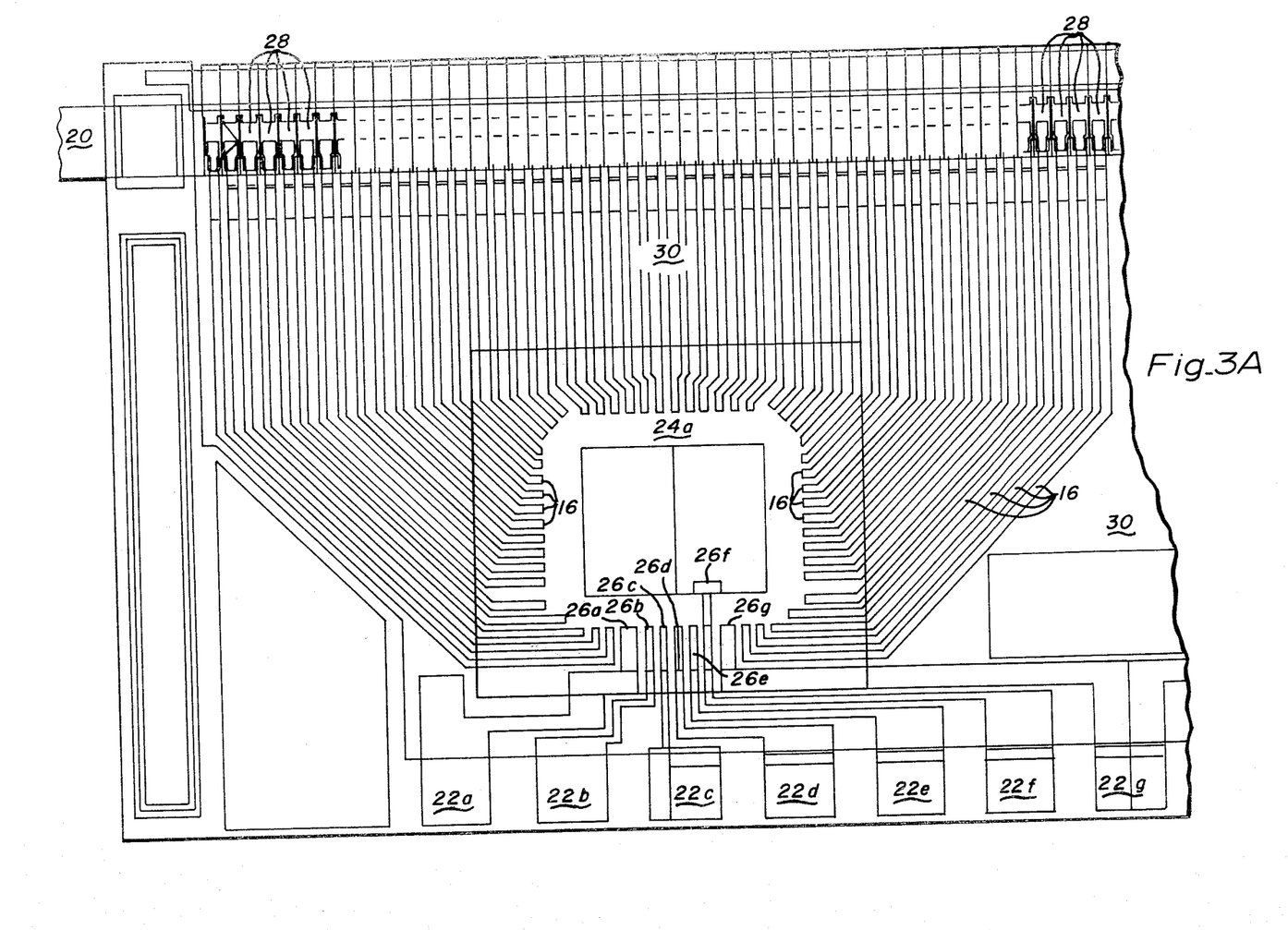
FIGS. 3A and 3B are each top plan views of a symbolic illustration of the substrate slab portion of the print head of FIG. 1, which FIGS. 3A and 3B when placed in juxtaposition illustrate the various layers deposited on the slab and the elements connected thereto.
Figure 3B:
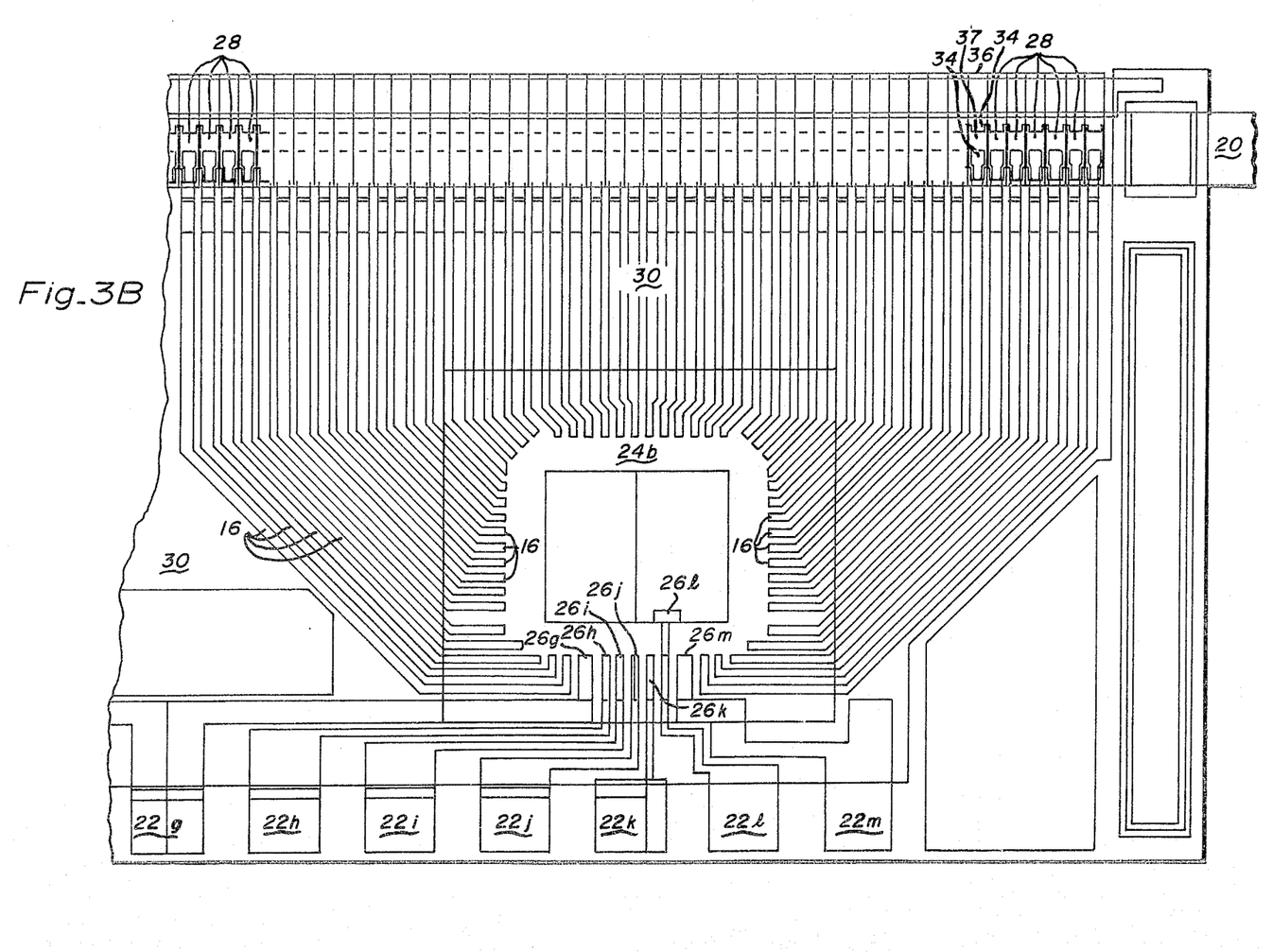

The upper planar surface of substrate slab 14 is covered with a series of deposited, etched or plated layers such that it resembles and performs the same function as a printed circuit board. (This is best illustrated in FIGS. 3A and 3B as hereafter discussed). One of the layers deposited on the surface of substrate slab 14 includes various electrically conducting traces (See FIG. 3), of which only a representative sample are illustrated in FIG. 1. The traces 16 each carry electrical current impluses to the various elements of the print head.

Mounted on the top surface of substrate slab 14 and electrically connected thereto, are two large scale integrated circuits 18A and 18B. LSIC'S 18A and 18B process incoming signals and deliver burn signals through individual traces 16 to individual heating elements which are deposited on a glass strip 20.

A total of ninety-six burn points are provided on the glass strip 20 in the preferred embodiment and are positioned laterally in side-to-side relationship. Forty-eight individual traces 16 extend from each LSIC 18A and 18B to discrete burn points. Thuse, each LSIC controls the delivery of electrical energy through forty-eight individual traces to forty-eight corresponding burn points on the glass strip 20.

Electrical power, data and control signals are delivered to the print head through thirteen connecting solder pads 22 which are located at the edge of substrate slab 14. Solder pads 22 are electrically conducting and provide a connection point to LSIC'S 18A and 18B.

FIG. 2 further illustrates that substrate slab 14 has a discrete thickness such that connecting posts 22 are displaced above conducting base 12, such that there is no electrical conductance between base 12 and solder pads 22. When the print head 10 is in actual use, solder pads 22 are bonded and electrically attached to signal delivery ribbons 23 which carry the data signals, control signals and power while base 12 is connected to a power source which delivers a significant electrical potential to the base. It can also be seen that glass strip 20 has a slight discrete thickness such that it extends above the surface of substrate slab 14.

FIGS. 3A and 3B, when placed in overlapping poisiton, illustrate a composite, scaled, symbolic representation of the various layers of deposit on substrate slab 14 and illustrate the interaction and electrical paths of such layers. The traces 16 are individual discrete strips of conductive material. A total of ninety-six individual traces 16 are illustrated, with forty-eight such traces being connected to each LSIC 18A and 18B (not shown). LSIC'S 18A and 18B do not appear in this figure, however, a pair of connecting rectangles 24a and 24b deposited upon substrate slab 14 are illustrated. The connecting rectangles 24a and 24a are the areas upon which the LSIC's 18A and 18B are mounted. The ends of the traces 16 extend close to the connecting rectangles 24a and 24b such that when the LSIC'S 18A and 18B are mounted the circuits contained within teh LSIC's will connect individually with each of the traces 16 via a wire bond.

A plurality of leads 26a–26m carry the input signals or power from the solder pads 22a–m to discrete points close to connecting rectangles 24. The signals and power delivered through the leads 26 also connect via wire bonds with individual circuits in LSIC's 18A and 18B when such LSIC's are mounted on the substrate 14. The traces 16, solder pads 22a–m and the leads 26a–m are deposits of a thick film conductive material designed to carry relatively high amperage. The thick film traces are deposited on the substrate slab 14 utilizing standard semiconductor manufacturing techniques.

In the preferred embodiment, the type of signals delivered to connecting rectangles 24a and 24b, and consequently to LSIC'S 18A and 18B (not shown) are symmetrically similar. The LSIC'S are identically constructed, as are the traces 16 and the connecting elements regrading each LSIC. In actuality, except for some asymmetry in the leads 26, the presently preferred embodiment is a side-by-side arrangment of two individual identical print head elements of forty-eight traces each and combined on one substrate slab for the purposes of economical manufacture and of obtaining a print width of usable nature when only one print head is utilized.

The internal processor contained in the main body of the printer (not shown) differentiates between the LSIC'S 18A and 18B and sends them differing data. Thus, the LSIC's 18A and 18B in operation will not be identical though in construction there is no difference between the element pairs on the head 10. Consequently, a description of one LSIC and the manner in which it operates applies equally to the other LSIC, and the same holds true for each half of the print head.

The thirteen leads connected to each of the LSIC'S 18A and 18B actually perform the function of fourteen in that lead 26g is connected to both 18A and 18B and thus functions as two leads. In the preferred embodiment, the outside leads 26a and 26m along with the dual purpose center lead 26g are connected directly to ground. Leads 26b and 26h carry the data signals from the microprocessor or data generation element in the main body of the printer to the respective LSIC'S. Leads 26c and 26i carry the burn signal, that is the signal tellng the print head when to apply heat to the desired areas of the thermally treated paper. Leads 26d and 26j, in the preferred embodiment, carry a power supply potential for the LSIC'S, e.g. +12 volts, to the print head from a power supply located in the main body of the printer. Leads 26e and 26k carry the clock signal to the integrated circuits. The clock signal determines the timing of the data delivery system. Finally, leads 26f and 26l carry the substrate biasing voltage, e.g. −5 volts, from the power supply in the main body of the printer to the LSIC'S and the transitors contained therein.

LSIC'S 18A and 18B translate the various input data signals, control signals and voltages delivered through leads 26a–m and generate appropriate signals along the respective forty-eight individual traces 16 to individual burn points 28. Each burn point 28, of which there are ninety-six, has a corresponding trace 16. Forty-eight burn points are controlled by each LSIC. The individual burn points 28 are located on top of the glass strip 20 as shown.

The construction of substrate slab 14 further includes the deposit of the protective-passivating layer 30 which covers the entire surface of the slab and the layers deposited thereon with the exceptions of connecting rectangles 24, solder pads 22 and certain areas on the unused portion of the sides of the slabs where such protection is not required. Protective-passivating layer 30 operates to protect the various elements deposited on the substrate slab from chemical or physical abrasion and from static electricity. Layer 30 does not extend over connecting squares 24a or 24b, leads 26 or pads 22, because it is necessary for external electrical connections to be made to the substrate slab at these points; that the LSIC'S 18A and 18B be connected by wire bonds to the free ends of leads 26 and traces 16 within rectangles 24a and 24b; and that the solder pads 22 be connected to the leads 26 and ribbon connectors 23 (not shown).

Figure 4:
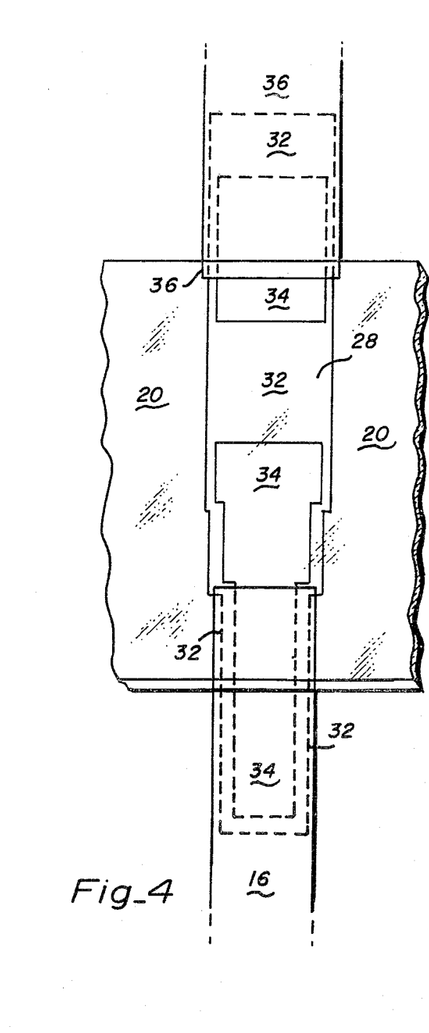
FIG. 4 is an enlarged top plan view of a single burn point area of the print head as illustrated in FIG. 3.

FIG. 4 depicts an enlarged diagram of an individual burn point 28 illustrating the detail and interaction of the various layers of deposit on the substrate slab at such burn point. Each burn point 28 comprises several layers of material deposited on the surface of substrate slab 14. The operation of the burn point is such that a point heat source is created responsive to an appropriate signal from the LSCI. The point heat source results in a burn point on the thermal paper when said paper is juxtaposed in contact with the glass strip 20 immediately encompassing said burn point. In this manner a visual dot congruent to the burn point is caused to appear on the specially treated paper. Thus, the data delivered to the print head is translated into a visual representation upon the paper.

Each individual burn point 28 is constructed by the deposit of a layer of thin film resistor 32. The film 32 extends the entire length of the burn point. A pair of deposits of thin film conductor 34 are deposited towards the ends of the burn point area such that they do not connect with one another. The end of trace 16, which is a thick film conductor 36 extends so as to underlap the layers of thin film resistor 32 and thin film conductor 34 on one end of the burn point. A further layer of thick film conductor 36 underlaps with resistor 32 and thin film conductor 34 at the further end of the burn point area. The central portion of burn point 28, and the area in which the heat point is actually generated, is located on the glass strip 20 which extends the entire width of the print head 10 and encompasses all ninety-six of the individual burn points 28. It can be seen that only thin film resistive layer 32 extends through the central portion of the burn point area. It is this rectangular area, which may be approximately 15×15 mils. (0.001"), that constitutes the specific dot at which heat is generated. Heat is generated in this area by the application of significant voltage potential between the two portions of thin film conductor 34 such that resistor 32 is induced to carry an electrical current and thus cause generation of a significant amount of heat energy.

Thin film conductor 34 is utilized o provide a better ohmic contact with resistor 32 than the thick films 16 and 36 and also because it does not conduct heat away from the burn area as quickly during the burn period.

In the preferred embodiment of print head 10, thick film conductor 36 extends over the surface of the terminal end of substrate slab 14 so as to contact directly conductive base 12. Conductive base 12 carries a constant voltage potential, e.g. approximately +20 volts. Thus, a constant +20 potential is carried by thick film conductor 36 to thin film conductor 34 at one end of burn point 28. In the non-burn mode trace 16 extends to an open in the associated LSIC 18A and 18B such that no circuit is completed and no current passes across resistor 32 to generate heat. However, when a burn is desired the appropriate LSIC 18A or 18B causes trace 16 to be connected through a low resistance driver transistor to ground. Thus, in the preferred embodiment a potential of approximately 20 volts is delivered across the burn point 28 from the potential on base 12. This causes a significant current through resistor 32 such that the resistor at the burn point area rises in temperature to approximately 250° C. This heat causes a darkening of the thermally treated paper which is juxtaposed in contact with the glass strip 20 immediately adjacent to the burn point Glass strip 20, which encompasses the burn point, acts as a partial conductor and partial insulator of heat energy. The glass material is such that it will conduct heat at a limited rate, such rate being low enough that the rapidly generated heat in resistor 32 is not significantly immediately conducted through the glass to the heat sink of substrate slab 14. Instead, the glass acts to insulate the immediate area of the burn point 28 such that the maximum amount of heat generated therein is immediately delivered to the thermally treated paper. This character facilitates clean, well defined, image generation on the printing medium when a burn is desired. However, the insulation properties of the glass strip are primarily in response to rapidly generated or step-wise generated heat. The material itself conducts finite amount of heat away from the area and into the heat sink of substrate slab 14. Consequently, when the connection to ground of trace 16 is opened and the potential across burn point 28 is terminated the material in glass strip 20 conducts the heat away from the area and into the heat sink. This dissipation allows the burn point to cool such that residual heat in the burn point does not cause undesired burns or ghost images on the thermally treated paper when a new area of paper is brought into contact with the burn point. Consequently, the heat conductive properties of material of the glass strip 20 cause the preferred embodiment to create clean, sharp burns when burns are desired and rapidly cools the burn points such that no image is produced on the paper when a burn is not deisred.

Figure 5:
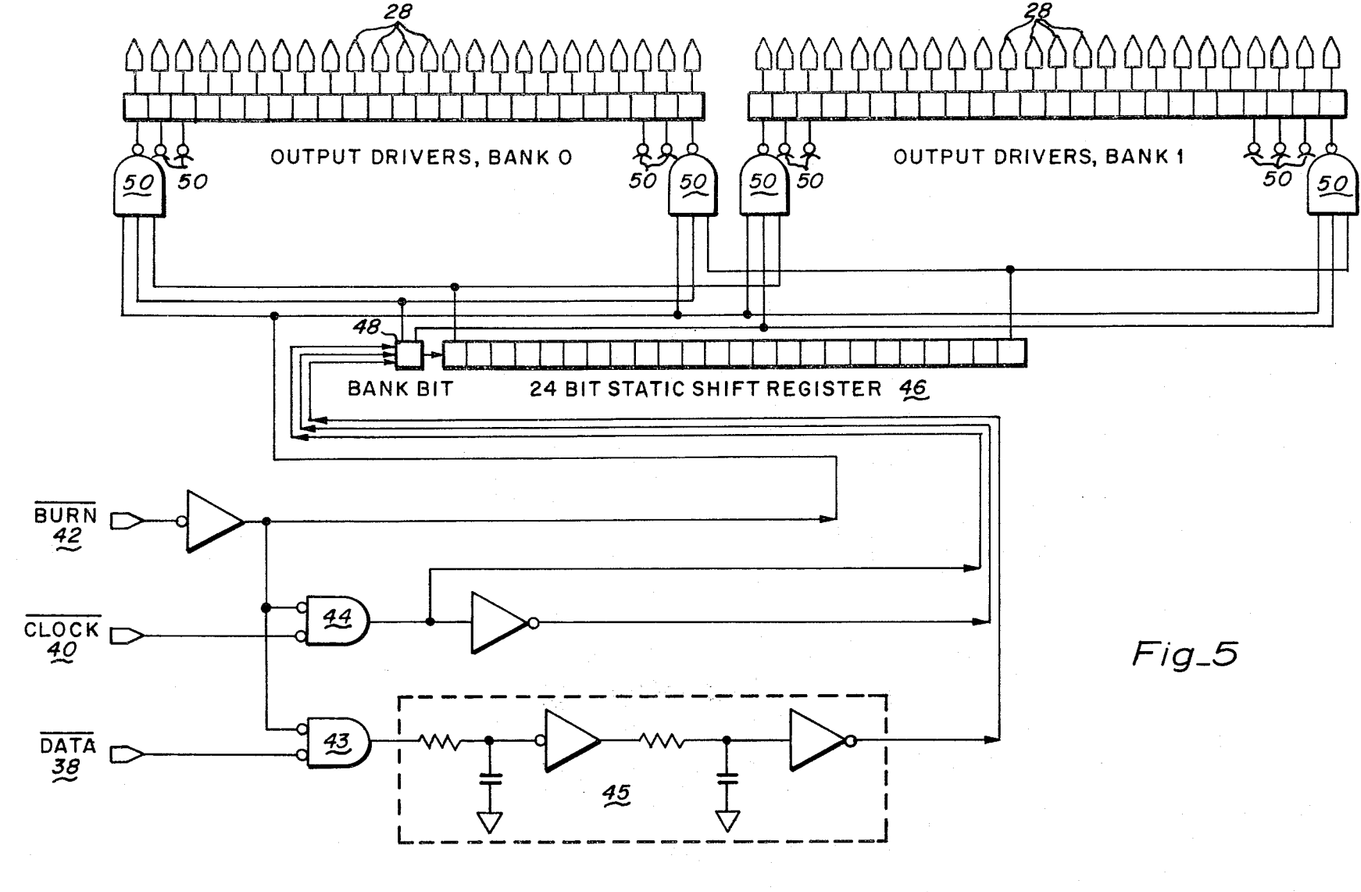
FIG. 5 is a circuit diagram illustrating the interconnection of the large scale integrated circuits within the print head in conjunction with the heat generation mechanisms of the preferred embodiment.

Referring now to FIG. 5, a symbolic diagram illustrates the electrical operation of the LSIC'S 18A and 18B and the manner in which the burn points are activated. As illustrated, command signals of three distinct varieties enter the appropriate LSIC 18A and 18B. These signals are a data signal 38, a clock signal 40 and a burn signal 42.

In the preferred embodiment the components utilized operate using negative logic. However, since this aspect does not affect the theory of operation, description of the theory of operation will proceed as if positive logic has been utilzed.

Each of the signals delivered to the LSIC'S 18A and 18B is a binary step function having either a "0" or "1" value. For the purpose of simplicity, it will be presumed that the various elements of the circuits illustrated in FIG. 5 will operate as AND gates which function when all of the necessary inputs have a "1" value, rather than as the NOR and NAND gates illustrated.

The data signal 38, in the form of the step signal of "0" or "1" characteristic is received into LSIC 18A and 18B through solder pads 22b or 22h and consequently through leads 26b or 26h as illustrated in FIG. 3. As the data signal reaches the LSIC 18A and/or 18B it is subjected to a delay circuit 45. The purpose of delay circuit 45 is to synchronize the data signal 38 with clock signal 40 such that the microprocessor or other unit within the body of the printer can change data and clock signals simultaneously and yet the correct data will be accepted by LSIC 18A and 18B without ambiguity.

Clock signal 40 is a regular uniform step signal delivered to the LSIC by a signal generator contained in the body of the printer. Each clock pulse signal 40, synchronized with the pulses of data signal 38 causes an item of data of either "0" or "1" characteristic, depending on the data signal, to be entered into a 24-bit static shift register 46 or in signal bank bit 48. In this manner bits of data are serially delivered to the static shift register 46 until each of the 24 bits contains either a "0" or "1" signal. The twenty-fifth bit of data is delivered to bank bit 48 and is utilized to determine to which bank of output drivers 50 the signal will be delivered.

While each LSIC 18A and 18B controls a total of forty-eight burn points 28 and consequently forty-eight output drivers, it is necessary to have only one 24-bit static shift register 46. This is true because the output drivers 50 can be divided into two banks, "BANK 0" and "BANK 1" and th bank bit 48 determines to which bank the signals from the static shift register are delivered.

Each of the bits in the static shift register 46 corresponds directly to an individual output driver 50. Output dirvers 50 are AND gates which, upon proper signal, cause the generation of a burn in burn points 28.

After all 24 bits in static shift register 46 as well as the bank bit 50 have been filled with data a burn signal 42 is generated. Burn signal 42 is also a pulse signal. At the time when burn signal 42 is generated, depending on the condition of bank bit 48, a burn is accomplished in either BANK 0 or BANK 1 of output drivers 50. Further, depending on the condition of each of the bits in static shift register 46 a burn will either be caused or not caused in each of the corresponding output drivers 48 and burn points 28. The logic of the system is such that when output driver AND gates 50 receive signals of characteristic "1" from the corresponding bit in the static shift register 46, the appropriate bank bit signal, and a burn signal simultaneously, AND gate 50 will cause trace 16 of the corresponding burn point 28 (as illustrated and described in connection with FIG. 4 herein) to be connected to ground, thus creating a 20 volt potential across resistor 32 at burn point 28. In this manner a point source of heat is created at the burn point and a corresponding dot is created on the thermal paper.

The data signals 38 which are delivered to bank bit 48 will alternate between "0" and "1" such that the output drivers, BANK 0 and BANK 1 will be loaded and fired alternately. The utilization of such a system in the preferred embodiment carries two advantages. The first advantage is that such a system requires the use only of a single 24-bit shift register to operate forty-eight drivers and burn points. This simplifies the LSIC 18A and 18B and reduces the cost of construction of the print head 10. A second advantage of this system is that the heat drainage characteristics from the individual burn points is improved. This improvement in heat conduction is accomplished because the alternate firing of the banks, BANK 0 and BANK 1, allows for greater local cooling the delivery of the excess heat to the heat sink of substrate slab 14. This improves the sharpness and clean definition of the burns and non-burns delivered to the medium.

Figure 6:
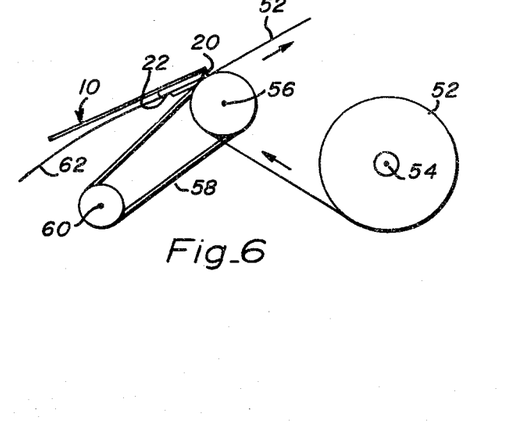
FIG. 6 is a left side elevational view of the preferred embodiment of the thermal print head in interaction with the remaining elements of a typical thermal printer and illustrating interaction of the print head with the thermal paper and the manner in which the paper is driven so as to create the desired printing matrix.

Referring now to FIG. 6, the orientation of the print head 10 relative to the remaining relevant elements of the thermal printer is illustrated. As shown, a supply of thermal paper 52 is arrayed on a roll 54. The width of the paper is determined by the number of print heads 10 arrayed side-by-side in the printer. The number of side-by-side heads 10 can be of any value provided the remainder of the printer is designed to accommodate such width. Paper 52 unrolls from roll 54 and is guided around a platen 56. At a horizontal to one row of points on platen 56, the paper comes into contact with the glass strip 20 on the print head 10. It is at this point that the burn signals are delivered from the print head to the paper. After the print cycle has been accomplished paper 52 is advanced off platen 56 and to a position where the print is visible to the observer.

The movement of paper 54 is controlled by the rotation of platen 56. Platen 56 is connected via belt 58 to a stepper motor 60. Stepper motor 60 causes platen 56 to rotate in discrete step-wise motions of equal degree.

The signals from the main body of the printer are delivered to print head 10 via ribbon cable 62 the individual connectors 23 of which connect to solder pads 22 on the print head, and consequently, through leads 26 into LSIC'S 18A and 18B.

In operation stepper motor 60 advances the platen 56 and consequently paper 52 into contact with glass strip 20 and the row of burn points for a discrete uniform period of time. During this time interval, the signals and operation of the circuitry as described above take place until each output driver 50 on the print heads has completed a burn cycle. Stepper motor 60 then causes paper 52 to be advanced a discrete distance and the burn cycles are repeated. In this manner it is possible to create any array of alphanumeric symbols, figures or drawings while moving only the paper with the print head 10 itself stationary. The limiting factor as to the type of print generated by this head is the programming of the processor and not any limitation as to the matrix or the design and array of the burn points of the print head except that the dots are of finite size and therefore the print resolution is not infinite.

A thermal printer utilizing a print head 10 of the preferred embodiment is designed so as to print a matrix array for the symbols to be generated. That is, an alphanumeric character can be shown by the specific darkening of individual points within a graphic array. Typical sizes of arrays utilized are 5×7 and 7×9. This means that the width of a character in a 5×7 matrix would be five burn points and its height would be equivalent to seven advances of the stepper motor. It is desirable that the distance the paper is advanced by the stepper motor in one step is equivalent to the width of a burn created by a single burn point.

Thus, for example, if only the five left hand side burn points on the print head 10 illustrated in FIG. 3 are considered; then the delivery of a burn signal to the third such burn point and a non-burn signal to the first, second, fourth and fifth of said burn points for seven consecutive time intervals during which the stepper motor has advanced a total of seven positions would create a straight line or a numeral 1 on the printing paper.

The type of array utilized in the printer is determined by the programming of the microprocessor or other data processing system within the printer and is totally unlimited by the construction of the print head. The only limitations created by the print head 10 are the lateral spacing between the individual burn points on the print head and consequently, the dots on the paper and the vertical spacing caused by the size of the steps created by the stepper motor.

In operation the timing of the signals delivered to the print head 10 is as follows: the interval between burn signals is sufficient such that at least twenty-five clock pulses will have passed, thus filling each bit in the 24-bit static shift register as well as the bank bit in bank 48. Thus, when a burn signal is generated the registers will always be full and each of the twenty-four burn points will receive specific burn or non-burn signals. Two burn signals are required in order to fire both BANK 0 and BANK 1. Therefore, a single line of dot generation requires a time equal to the generation of two burn signals. Consequently, the timing between steps of movement of stepper motor 60 must be greater than the timing of the generation of two burn signals.

Although described herein in terms of positive logic, and illustrated in terms of negative logic, a 24-bit shift register, two LSIC'S, and ninety-six burn points per print head, it may also be seen that the thermal print head of the present invention will function equally well with alternate construction and input. The number of burn points, LSIC'S, and solder pad connections is limited only by the desired size of the resulting print head. Thus, alternate embodiments of the present invention utilizing different material, size or number of elements are very possible and feasible.

Although the present invention has been described above in terms of the presently preferred embodiment, it is to be understood that such disclosurer is not to be considered as limiting. Accordingly, it is intended that the appended claims be interpreted as covering all alterations and modifications as fall within the true spirit and scope of the invention.

What is claimed is:

1. A thermal print head comprising:
   a base plate;
   a substrate slab of electrically insulating material mounted upon said base plate, deposits on the upper surface of such slab including a plurality of isolated individual resistors comprising thin film deposits of electrically resistive material arrayed linearly across said slab, a plurality of isolated electrically conductive traces equal in number to and respectively connected at one end to each of said resistors, conductive means for delivering electrical potential to said resistors at points displaced from the connections of said traces, an electrically insulating strip encompassing the surface of said resistors, and a plurality of isolated electrically conductive leads;
   means for delivering electrical potential and data signals to said leads; and
   at least one integrated circuit for controlling the electrical energy delivered to said resistors mounted upon such substrate slab, said integrated circuit being electrically connected to the opposite end from said resistors of each of said conductive traces and also connected to each of said conductive leads.

2. A thermal print head as recited in claim 1 wherein, said base plate is rectangular in shape; and
   said substrate slab is a rectangular solid mounted with its outside edges vertically congruent with the edges of one end of said base plate.

3. A thermal print head as recited in claim 1 wherein, each of said resistors comprises an elongated rectangular deposit of a resistive material with one end in electrical contact with one of said traces and the other end in electrical contact with said conductive means.

4. A thermal print head as recited in claim 1 wherein, said conductive traces comprise isolated individual strips of material with one end connected to one of said resistors and the other end connected to discrete contact points on such integrated circuit.

5. A thermal print head as recited in claim 1 wherein, the base plate is electrically conductive and is connected to a power supply means adapted for generating electrical potential, and said conductive means comprises a deposit of electrically conductive material extending over the edge surface of said substrate surface to contact said base plate.

6. A thermal print head as recited in claim 1 wherein, said leads comprise deposits of conductive material on the surface of said substrate slab; and said means for delivering electrical potential and data signals to said leads comprise a plurality, equal in number to said leads, of discrete electrically conducting solder pads respectively contacting said leads and extending outwardly from the surface of said substrate slab so as to be accessible to connection with data signals and potential generation means situated external to said thermal print head.

7. A thermal print head as recited in claim 1 wherein, said electrically insulating strip is comprised of a material having a finite rate of thermal conductance, such rate being significantly greater than zero and significantly lower than the rate of heat generated by the application of the desired electrical potential across said resistors.

8. A thermal print head as recited in claim 1 wherin, each of said integrated circuits comprises a large scale integrated circuit capable of receiving signals and potentials from said leads and selectively opening and closing circuits on a plurality of said traces.

9. A thermal print head as recited in claim 5 wherein, said base plate is connected to a power supply and carries a constant large electrical potential; and each of said integrated circuit operates, on appropriate external signals, to connect said traces to ground thus creating a significant potential across said resistors resulting in a current across said resistors and generation of thermal energy in the immediate area of said resistors.

10. A thermal print head as recited in claim 9 wherein, each said integrated circuit includes an even number of output drivers, corresponding on a one-to-one basis with said traces and resistors, which function on appropriate signal, to connect such traces to ground, said output drivers being divided into two equal banks, a static shift register having storage bit capacity equal to one half the number of output drivers controlled by such integrated circuit, each bit in such register corresponding to a specific output driver in each such bank and determining the signal to be delivered to such driver, a bank bit, the character of the information therein contained determining the bank of output drivers to which signals will be delivered, means for delivering external data signals to said static shift register and said bank bit; and means for powering the operation of said shift register, bank bit and output drivers.

11. A thermal print head comprising:

a rectangular base plate of electrically conducting material for carrying an electrical potential from an external power supply;

means for connecting said base plate to an external power source;

a rectangular substrate slab of material mounted to cover one end of said base plate, said substrate slab being of an insulator and thermal absorber material and having deposited on the upper surface thereof;

a plurality of resistors equal in number to a multiple of forty-eight, each resistor comprising an elongated rectangular deposit of an electrically resistive material arrayed in a side-by-side row extending along a long axis of said slab and displaced from the center thereof upon the upper surface of said substrate slab, a plurality of traces equal in number to the number of resistors, each of said traces comprising an isolated strip of a thick film electrically conducting material having one end thereof connected to the end nearest the center of said slab and the other end connected to a corresponding resistor, a conductive layer for providing electrical contact between said base plate and said resistors, the conductive layer extending over the edge of said substrate slab in contact with said base plate and onto the upper surface of said slab in contact with the outer end of each of said resistors, a strip of electrically insulating material deposited so as to encompass the central portion of each of said resistors, such strip having a finite rate of thermal conductance greater than zero and lower than the rate of heat generation caused by application of the desired electrical potential across such resistors, and at least six conductive leads for each integrated circuit adapted for carrying externally generated electrical signals and potential, and conductive leads having contact areas extending to the edge of said slab opposite said conductive layer and extending on the slab surface to the interior thereof;

means for connecting said leads to external signal and power sources; and a large scale integrated circuit for each group of forty-eight resistors mounted on the interior upper surface of said substrate slab, including, means for connecting each said circuit with the interior ends of said leads, means for connecting with the ends of said traces, and operational means for receiving signals through said leads, storing and collating said signals and, upon appropriate combination of said signals, connecting selective of said traces to groung potential so as to create a current through said resistors and to generate heat thereby.

12. A thermal print head as recited in claim 11 wherein, said leads comprise a lead for carrying data signals, a lead for carrying clock signals, a lead for carrying burn signals, a lead for carrying base biasing voltage, a lead for carrying circuit operating voltage, and a lead for carrying ground potential.

13. A thermal print head as recited in claim 12 wherein said operational means comprise:

forty-eight individual output drivers for each large scale integrated circuit, the drivers being connected to said traces for connecting said traces to ground potential upon appropriate signals, such output drivers being divided into two banks of twenty-four drivers;

a 24-bit static shift register for receiving and serially retaining data received through said leads with each bit therein corresponding to a specific output driver in each of said banks;

a bank bit for receiving a data signal and determining to which bank for drivers signals from said shift register will be delivered; and means for delivering signals from said leads to said shift register and said shift register for delivering ground potential and biasing voltage to said output drivers and for delivering signals from said shift register and said bank bit to said output drivers.

14. A thermal print head as recited in claim 12 wherein, each of said output drivers comprises a gate for closing the connection between said trace and said ground potential upon simultaneous reception of said burn signal, said signal from the corresponding bit in said shift register and said signal from said bank bit.

15. A thermal print head comprising:

an electrically conductive base plate adapted for connection to a power supply means generating electrical potential;

a substrate slab of electrically insulating material mounted upon said base plate, deposits on the upper surface of such slab including a plurality of isolated individual resistors comprising deposits of electrically resistive material arrayed linearly across said slab, a plurality of isolated electrically conductive traces equal in number to and respectively connected at one end to each of said resistors, conductive means for delivering electrical potential to said resistors at points displaced from the connections of said traces, said conductive means comprising a deposit of electrically conductive material extending over the edge surface of said substrate surface to contact said base plate, an electrically insulating strip encompassing the surface of said resistors, and a plurality of isolated electrically conductive leads;

means for delivering electrical potential and data signals to said leads; and at least one integrated circuit for controlling the electrical energy delivered to said resistors mounted upon such substrate slab, said integrated circuit being electrically connected to the opposite end from said resistors of each of said conductive traces and also connected to each of said conductive leads, said integrated circuit being operable on appropriate external signals to connect said traces to ground to create a potential across said resistors resulting in a current across said resistors and generation of thermal energy in the immediate area of said resistors, each said integrated circuit including an even number of output drivers, corresponding on a one-to-one basis with said traces and resistors, which function on appropriate signal, to connect such traces to ground, said output drivers being divided into two equal banks, a static shift register having storage bit capacity equal to one half the number of output drivers controlled by such integrated circuit, each bit in such register corresponding to a specific output driver in each such bank and determining the signal to be delivered to such driver, a bank bit, the character of the information therein contained determining the bank of output drivers to which signals will be delivered, means for delivering external data signals to said static shift register and said bank bit; and means for powering the operation of said shift register, bank bit and output drivers.

* * * * *